(12) United States Patent (10) Patent No.: US 12,693,044 B2

Carrascosa Pérez (45) Date of Patent: Jul. 28, 2026

(54) SOLAR CONCENTRATOR FACET, SOLAR CONCENTRATOR COMPRISING SAID FACET AND METHOD OF INSTALLATION THEREOF

(71) Applicant: C Dos Consulting & Engineering, S.L., Madrid (ES)

(72) Inventor: Marco Antonio Carrascosa Pérez, Madrid (ES)

(73) Assignee: C DOS CONSULTING & ENGINEERING, S.L., Madrid (ES)

( * ) Notice: Subject to any disclaimer, the term of this patent is extended or adjusted under 35 U.S.C. 154(b) by 431 days.

(21) Appl. No.: 18/264,322

(22) PCT Filed: Feb. 18, 2022

(86) PCT No.: PCT/EP2022/054127

§ 371 (c)(1),
(2) Date: Aug. 4, 2023

(87) PCT Pub. No.: WO2022/175476

PCT Pub. Date: Aug. 25, 2022

(65) Prior Publication Data

US 2024/0102699 A1 Mar. 28, 2024

(30) Foreign Application Priority Data

Feb. 18, 2021 (EP) ..................................... 21382131

(51) Int. Cl.
*F24S 23/77* (2018.01)
*F24S 23/70* (2018.01)

(52) U.S. Cl.
CPC ............... *F24S 23/77* (2018.05); *F24S 23/82* (2018.05); *F24S 2023/874* (2018.05)

(58) Field of Classification Search
CPC ................. F24S 2023/874; F24S 25/40; F24S 2025/804; F24S 25/12
See application file for complete search history.

(56) References Cited

U.S. PATENT DOCUMENTS

| | | | | |
|---|---|---|---|---|
| 3,401,390 A | * | 9/1968 | Braccini | H01Q 15/162 |
| | | | | 343/915 |
| 3,906,927 A | * | 9/1975 | Caplan | F24S 20/20 |
| | | | | 126/696 |
| 4,502,200 A | * | 3/1985 | Anderson | F24S 23/82 |
| | | | | 29/897 |

FOREIGN PATENT DOCUMENTS

| | | | | |
|---|---|---|---|---|
| EP | 2410259 A1 | 1/2012 | | |
| EP | 3179177 A1 | 6/2017 | | |
| WO | WO-2012159204 A1 | * 11/2012 | | F24S 25/30 |

OTHER PUBLICATIONS

International Search Report in PCT/EP2022/054127, mailed Mar. 28, 2022, 3 pages.

(Continued)

*Primary Examiner* — Jorge A Pereiro

(74) *Attorney, Agent, or Firm* — Arentfox Schiff LLP

(57) ABSTRACT

The invention relates to a facet for solar concentrators, suitable for its use as reflective element of a heliostat, the facet comprising a main body defining a front surface and a back surface. Advantageously, the back surface of the main body is attached to at least three substantially linear ribs, which are arranged substantially parallel along said back surface, and wherein at least one of the three ribs is configured with adjustable anchoring means adapted for their connection to the structure of a solar concentrator. Moreover, the anchoring means are adapted such that the distance between at least one of the three ribs and the structure of a solar concentrator can be varied. The invention (Continued)

also relates to a solar concentrator comprising said facet, and to a method of installation thereof.

15 Claims, 4 Drawing Sheets

(56)                    References Cited

OTHER PUBLICATIONS

Written Opinion in PCT/EP2022/054127, mailed Mar. 28, 2022, 8 pages.

* cited by examiner

SOLAR CONCENTRATOR FACET, SOLAR CONCENTRATOR COMPRISING SAID FACET AND METHOD OF INSTALLATION THEREOF

CROSS-REFERENCE TO RELATED APPLICATIONS

This application is a 35 U.S.C. § 371 National Phase of PCT Application No. PCT/EP2022/054127, filed Feb. 18, 2022, which claims priority to European Application No. 21382131.7, filed Feb. 18, 2021, the disclosures of each of which are incorporated herein by reference in their entirety.

FIELD OF THE INVENTION

The present invention relates to solar concentration technologies for generating energy in the form of heat, electricity, etc. More specifically, the invention relates to a reflective element, or facet, for use preferably in heliostats or other lineal concentrators like Fresnel reflectors for thermal power production plants, wherein said facet comprises a plurality of structural ribs which are attached to the back side thereof.

BACKGROUND OF THE INVENTION

Since the beginning of the 1980s, a great variety of initiatives for the development of power plants using solar thermal concentration have been envisaged. One of the main objectives of many of the various technologies for concentrating and using solar energy is to minimise the losses of concentrated solar radiation, thereby obtaining thermodynamic conversions having higher energy efficiency and output.

Among said technologies, central tower concentrator and Fresnel reflector power plants are currently considered as one of the most effective options for generating solar thermal energy. These plants consist of a solar field conventionally made up of structures with multiple individual mirrors, configuring a large spherical caps or paraboloids, at the focus of which it is located a fixed receiving system, adopting the form of a tower structure (in heliostat power plants) or a linear axis structure (in Fresnel reflector power plants). By means of these technologies, solar radiation striking a plurality of reflective structures tracking the movement of the sun is concentrated and focused on a receiving element located at the top of the tower or in the focal axis. The receiving element thereby absorbs the received radiation and transfers it, in the form of thermal energy, to a carrier fluid, referred to as heat transfer fluid, to either be used directly in the corresponding thermal or thermodynamic process, or else to be stored as thermal energy, to be used at a later time.

The reflection of the radiation striking the reflective elements depends largely on the material and geometric properties of said elements, and on the variation of said properties in working conditions or due to the passing of time. Some of the features to be considered for the improvement of the quality of the radiation reflection are, inter alia, the optical quality of the reflective elements, as well as their curvature, weight, rigidity, impact resistance, or reflectivity.

The optical quality of a reflective surface denotes the angular deviation of the radiation reflected in said surface with respect to its theoretical reflection direction. This parameter directly affects the quality and shape of the reflected radiation beam, generating dispersion of the radiation and an increase in the size or deformation of the solar reflected image (i.e., the defined shape of reflected beam hitting the receiver) when the value of the angular deviation increases (i.e., optical quality decreases). In this context, a minor angular error in the mirror shape of the surface leads to a deviation of the reflected beam, which will generally also depend on the distance to the receiver.

The curvature of the facet is therefore a very important parameter since radiation will be concentrated at the focal point of the mirror according to geometrical optics. In this sense, it is important to define a suitable curvature for the reflectors according to their distance from the reflector to the receiver in the solar field. And, in order for the heliostat's reflective surface to have a correct curvature designed, each of the facets forming said surface must also be accurately curved. Normally, the supporting structure of a facet consists of a metallic frame or structure constituted by a plurality of metallic profiles of different sections, which are joined together by welding or by removable elements such as screws and nuts to configure said frame, which usually has an essentially rectangular shape. Afterwards, the reflective body is joined to the aforementioned frame, usually by means of adhesive materials.

As an example of the above technologies, based on metallic profiles, patent EP 2244034 B1 (Sener Ingeniería y Sistemas, S.A.) discloses a heliostat facet configured from a flat structure, comprising a plurality of profiles distributed on its surface. The facet is made from a stamped single metal sheet comprising a central section and a peripheral section comprising first and second sides, wherein both sections are linked together by a plurality of arms, which starting from the central section radially run towards the peripheral section taking as reference the geometrical centre of the facet. Additionally, in at least three of the arms, there are support points of the facet in the corresponding heliostat support. However, these known profiles used for curving the facets have a series of disadvantages, as follows: On the one hand, it is difficult to attain high repetitiveness in the dimensional quality in this type of big-size structures, as a result of the deformations caused by the stamping process, which results in a worse optical performance of the adhered reflective surface they support.

Consequently, manufacturing costs are high for large series of facets based on this concept, being hardly automatable.

U.S. Pat. No. 4,502,200 A discloses a heliostat facet comprising a plurality of longitudinally extending beams, and a plurality of transversely extending beams (41) connected with the longitudinally extending beams. Patent application EP 3179177 A1 discloses a facet comprising individual supports for anchoring said facet to the structure of a heliostat. However, the supports described in these documents do not allow curving the facets with respect to the longitudinal axis of said beams (in U.S. Pat. No. 4,502,200 A) or with respect to the longer side of the facets (in EP 3179177 A1) during the assembly of the heliostat. As a result, they only provide general orientation means of the facets' surface, but without enabling the curvature thereof.

An incorrect or deficient curving of the metal sheet can lead to a bad optical quality in the facet, since the sheet must be a rigid element. Likewise, decreasing the rigidity of the metal sheet for improving the curvature can lead to deformations in the facet due to the wind, thereby decreasing its optical quality.

A further problem related to these structures is due to the effect of temperature in the metal sheet. Since its surface covers most of the back region of the mirror, its expansion/ contraction due to temperature differences generates tension in the mirror's glass elements, which strongly affects the overall quality of the facet.

Finally, in order to obtain high rigidity values in the metal sheet it must be deeply folded, requiring the use of oil in the manufacturing process. This use is cumbersome since the oils must be removed before attaching the metal sheet to the mirror, since it negatively affects the adhesives involved in said attachment. Therefore, this process is complicated and expensive.

The present invention is presented as a solution to the aforementioned problems of the prior art.

SUMMARY OF THE INVENTION

A first object of the present invention relates, without limitation, to the development of a facet for solar concentrators, suitable for its use as reflective element of a heliostat or any other solar reflecting element such as a Fresnel concentrator, the facet comprising a main body defining a front surface and a back surface. Advantageously in the invention:
    the back surface of the main body is attached to at least three substantially linear ribs, which are arranged substantially parallel along said back surface (i.e., in a line matching the length or direction of said surface, preferably along the longer side of the facet, when it is rectangular, which generally corresponds to the horizontal), and wherein at least one of the three ribs is configured with adjustable anchoring means adapted for their connection to the structure of a solar concentrator; and
    the anchoring means are adapted such that the distance between at least one of the three ribs and the structure of a solar concentrator can be varied.

In a preferred embodiment of the invention, the ribs are channel-formed and comprise fixation surfaces adapted for their attachment to the back surface of the main body.

In a further preferred embodiment of the invention, the fixation surfaces comprise linear flaps arranged at both sides of the ribs. More preferably, the ribs are attached to the back surface of the main body though adhesive means applied to the linear flaps.

In a further preferred embodiment of the invention, the inner volume defined by the channel-formed ribs is configured as a housing for at least part of the anchoring means.

In a further preferred embodiment of the invention, each rib comprises one or more anchoring orifices adapted for receiving the adjustable anchoring means.

In a further preferred embodiment of the invention, one or more anchoring orifices comprise a fixation flange.

In a further preferred embodiment of the invention, the anchoring means comprise one or more washers, preferably configured as conical-spherical pairs of connectors. Thanks to this configuration, misalignments between the relative orientations of the longitudinal bars and the facet can be achieved, without affecting the relative orientation of the anchoring means and the facet. Moreover, this also avoids the generation of tension of deformation effects in the facet, for example during the canting operations.

In a further preferred embodiment of the invention, the main body of the facet comprises, a glass body, a metallic reflective body, a mirror body, a multi-layer or sandwich body, a plastic body, a foam body, a honeycomb body, or any combination thereof, in any technically possible order.

In a further preferred embodiment of the invention, the main body of the facet is substantially flat, non-flat, parabolic, cylindrical, hyperbolical, or spherical. More preferably, the main body of the facet is curved around an axis substantially perpendicular to the ribs.

A second object of the present invention relates to a solar concentrator comprising:
    a pedestal;
    a torque tube;
    a plurality of transverse arms supported by the torque tube, wherein the transverse arms are connected to a plurality of longitudinal bars arranged substantially parallel to the torque tube;
    one or more facets according to any of the embodiments described in the present document;
    wherein the longitudinal bars are configured with a plurality of anchoring points adapted to attach the facets to the longitudinal bars through the anchoring means.

In a preferred embodiment of the invention,
    the longitudinal bars are arranged substantially parallel to the torque tube;
    the transverse arms are arranged substantially perpendicular to the torque tube;
    the transverse arms are arranged on both sides of the torque tube;
    one, two or three of the anchoring means of the at least three ribs are adjustable; and/or
    the connection between the transverse arms and the longitudinal bars is obtained by means of a plurality of fixing means comprising screws, nuts, bolts, rivets, or flanges.

In a further preferred embodiment of the invention, at least part of the anchoring means is housed within the longitudinal bars.

A third object of the invention relates to a method for installing a facet according to any of the embodiments described in the present document, in a solar concentrators according to any of the embodiments described in the present document. Advantageously, said method comprises performing the following steps:
    a) mounting the facet in the solar concentrator, by connecting the facet to one or more longitudinal bars through the anchoring means;
    b) adjusting the curvature of the facet around an axis substantially parallel to the ribs, by varying the relative distances between at least one of the three ribs and the longitudinal bars.

In a preferred embodiment of the invention, a canting operation comprising orienting the facets relative to the solar concentrator is performed during step b) of the method.

In a preferred embodiment of the invention, the method further comprises the following step before step a):
    c) adjusting the curvature of the main body of the facet around at least one axis thereof, wherein said axis is substantially perpendicular to the axis adjusted in step b).

More preferably, in step c) above, a curvature in the main body of the facet is generated by attaching the back surface of the main body to the ribs.

As described in the preceding paragraphs, the invention proposes thus a solution based on facets for solar concentrators, and specifically for solar concentrators, which results in a substantial cost reduction per square meter in the entire solar field, and a simplification of the concentrator assembly and calibration systems thereof thus reducing the overall cost of energy production.

In the context of the invention, the expression "substantially" will be interpreted as equal to or comprised within a variation margin of ±10%.

Finally, the invention has the following main advantages compared to the prior-art alternatives:

Very high optical quality for curved facets in both axes, since one axis is preferably made during the fabrication of the facet, and the other when the facet is mounted on the solar concentrator. This allows obtaining very rigid and curved facets with a high geometrical precision.

Weight reduction with higher facet rigidity, better behaviour under wind loads.

Cost reduction by using longitudinal rib profiles, which are much simpler than a large, stamped piece.

Improved scalability of the dimensions of the facet, being able to achieve larger compared to stamped metal sheets.

NUMERICAL REFERENCES USED IN THE DRAWINGS

In order to provide a better understanding of the technical features of the invention, the referred FIGS. 1-4 are accompanied of a series of numeral references which, with an illustrative and non-limiting character, are hereby represented:

| (1) | Solar concentrator, Heliostat |
| (2) | Facet |
| (3) | Pedestal |
| (4) | Torque tube |
| (5) | Control cabinet |
| (6) | Transverse arms |
| (7) | Longitudinal bars |
| (8) | Fixing means |
| (9) | Anchoring points |
| (10) | Anchoring means |
| (11) | Main body of the facet |
| (12) | Linear ribs |
| (12') | Fixation surfaces |
| (13) | Anchoring orifice |
| (14) | Fixation flange |
| (15, 15') | Washers, conical-spherical pairs |
| (16, 16') | Nut fasteners |

DETAILED DESCRIPTION OF THE INVENTION

Different preferred embodiments of the invention, provided for illustrating but non-limiting purposes, are described below, referring to FIGS. 1-4 of the present document.

Figure 1:
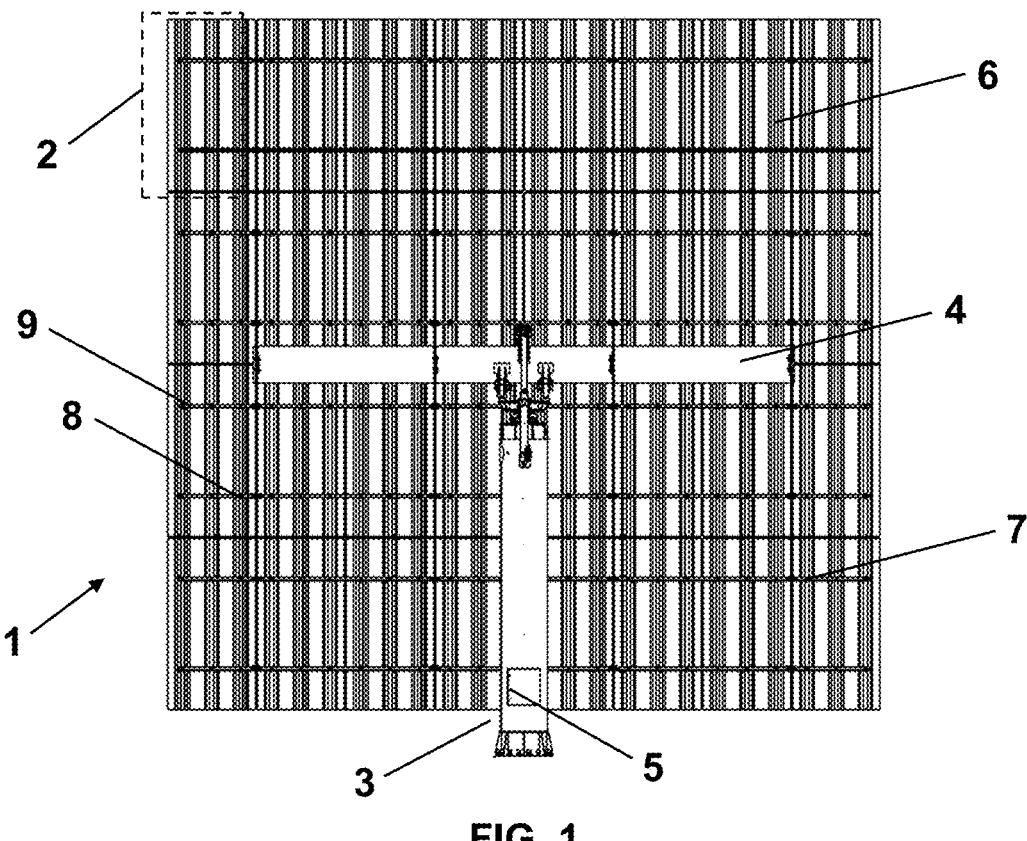
FIG. 1 shows a rear view of a heliostat and a plurality of facets according to a preferred embodiment of the invention.
Figure 2:
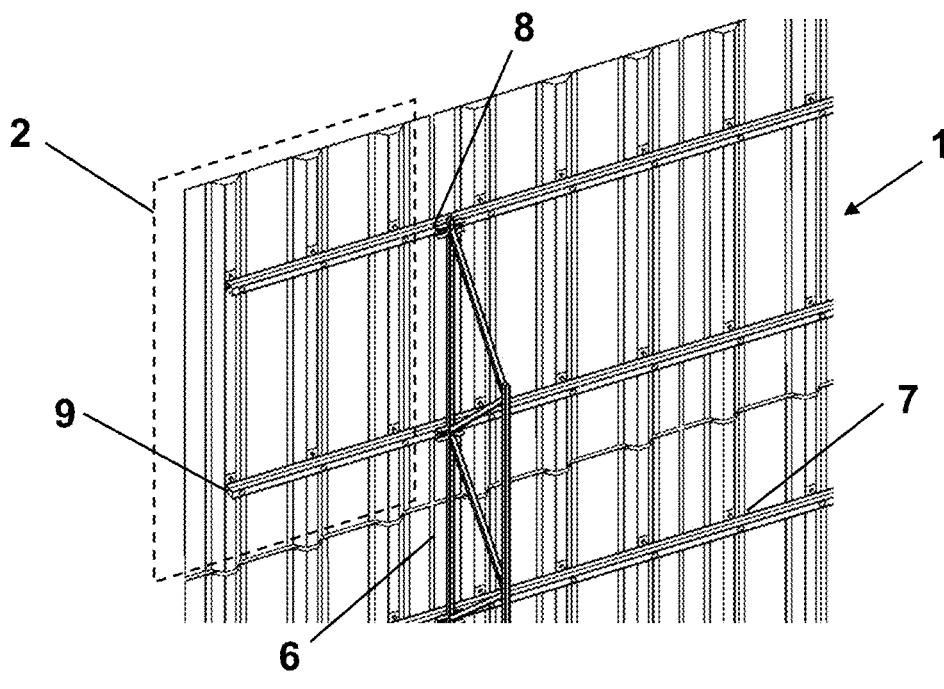
FIG. 2 shows a detailed view of the heliostat and the facets of FIG. 1.
Figure 3A:
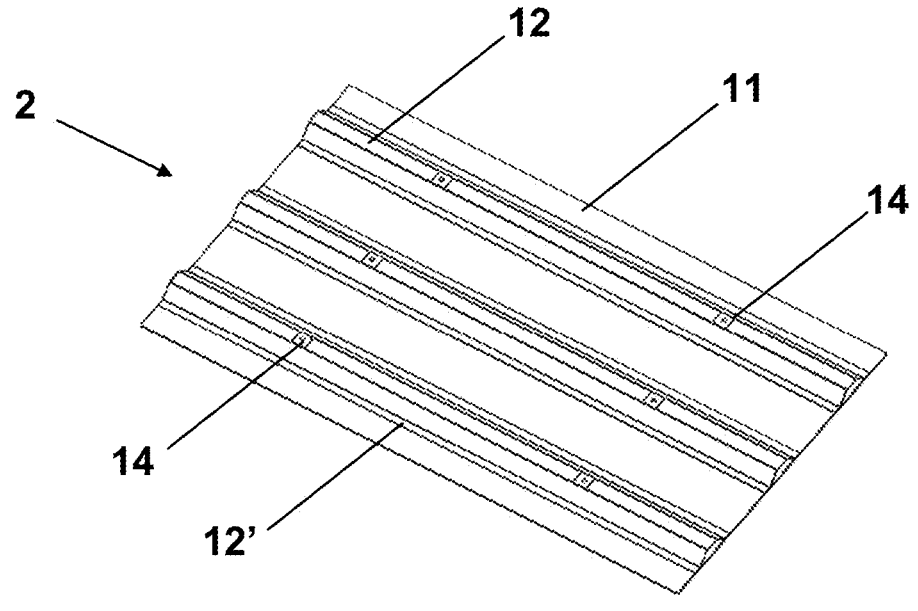
FIGS. 3a-3d show different views of a facet according to the present invention.
Figure 3B:
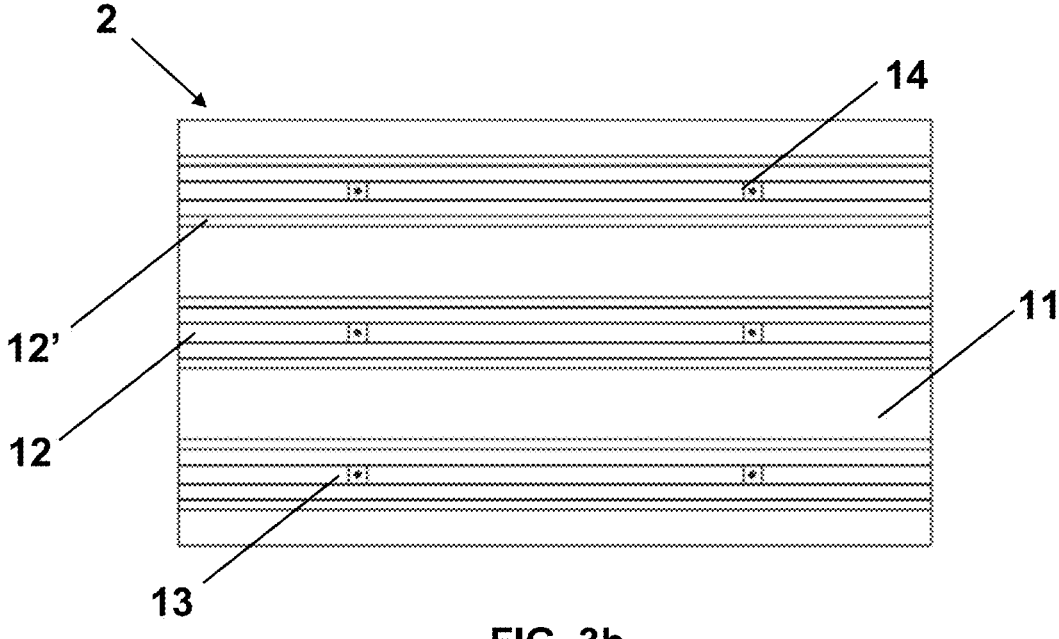
Figure 3C:
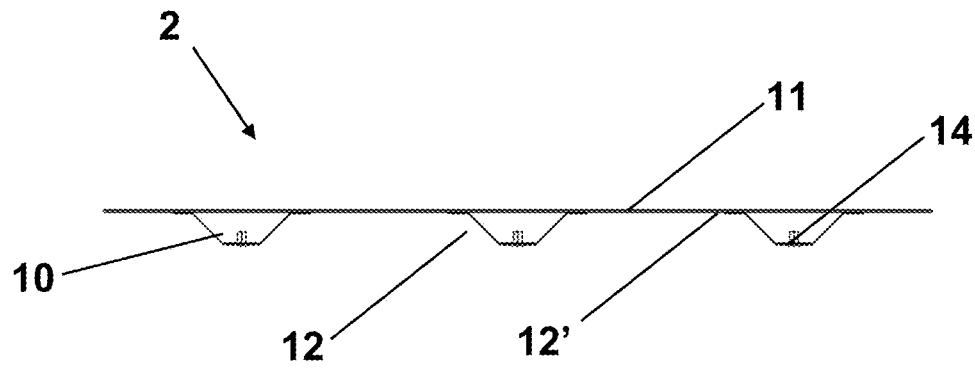
Figure 3D:
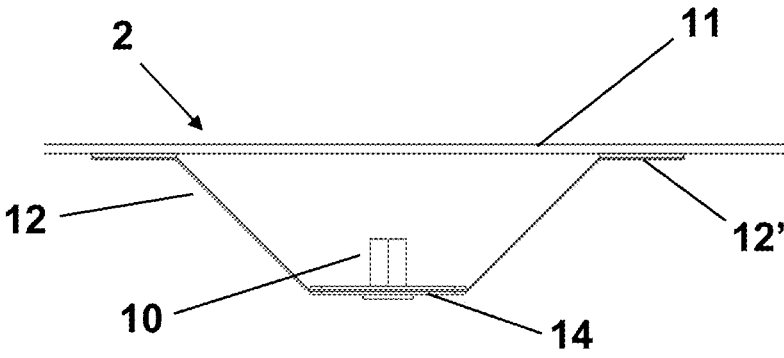

FIGS. 1-2 show a heliostat (1) adapted for the installation of a plurality of facets (2) according to a preferred embodiment of the invention. The combined surface of said facets (2) form the reflective surface of the heliostat (1) (or grid), typically ranging from 120 to 210 m² (however, smaller dimensions can be also implemented) whose structure is supported by a pedestal (3) and a torque tube (4), preferably configured with dual-axis tracking capacity (by means, for example, of corresponding zenith and azimuth drives). The pedestal (3) of the heliostat (1) of the invention has primarily a structural function, and it is fixed to a foundation and/or to the ground. Said pedestal (3) preferably incorporates a control cabinet (5) in which the control electronics of the heliostat (1) and corresponding electric power supply connections are located. Even though this embodiment will refer to a heliostat (1), this term can also apply to any solar concentrator.

The torque tube (4) supports a plurality of transverse arms (6), preferably arranged perpendicular thereto, wherein the arms (6) are preferably arranged on both sides of the torque tube (4), and connected to a plurality of longitudinal bars (7), arranged substantially parallel to the torque tube (4). The connection between the transverse arms (6) and the longitudinal bars (7) is obtained by means of a plurality of fixing means (8) which typically comprise screws, nuts, bolts, rivets, flanges, etc. Moreover, the longitudinal bars (7) are configured with a plurality of anchoring points (9) adapted to attach the facets (2) to the main body of the heliostat (1), thereby forming the heliostat (1) reflective grid and providing structural support thereto. As an example, FIG. 1 shows a heliostat (1) whose grid is formed by 8×4 rectangular facets (2). In the figure, the surface of the top left facet (2) has been highlighted within a rectangle in dashed lines (see also a detailed view of the facet (2) in FIG. 2).

The facets (2) are connected to the longitudinal bars (7) by corresponding anchoring means (10) which are applied to the anchoring points (9) of the bars (7). Said anchoring means (10) preferably adopt the form of adjustable bolts and fasteners, and are adapted such that the distance between the bars (7) and the facet (2) at the position of each anchoring point (9) can be varied. As it will be seen in the following paragraphs, this feature is key in order to obtain a desired curvature configuration of each facet (2), and also in the heliostat (1) as a whole (by canting the facets).

A preferred embodiment of the facet (2) of the invention is shown in FIGS. 3a-3d. As represented in said figures, the facet (2) comprises a main body (11) which configures the reflective surface of the facet (2). This body (11) can be of any type of the known configurations of the prior art comprising, for instance, a glass body, a metallic reflective body, a mirror body, a multi-layer (or sandwich) body, a plastic, foam, or honeycomb body, and any combination thereof, in any technically possible order. As a result of this combination, the main body (11) of the facet (2) is characterised by having a front surface (typically the reflective surface configured for facing the receiver) and a back surface (typically a support, structural or protective surface which will in general not be subject to direct solar radiation). The main body (11) of the facet (2) can also adopt several geometries and curvatures, being for example substantially flat, parabolic, spherical, cylindrical, hyperbolical, or comprising any other suitable geometry.

Advantageously in the invention, the back surface of the main body (11) of the facet (2) is attached to a plurality of linear ribs (12), at least three, which are preferably arranged substantially parallel along said surface. The ribs are preferably channel-formed and comprise fixation surfaces (12'), preferably in the form of linear flaps, arranged at both sides of the ribs (12) for their attachment to the back surface of the main body (11) of the facet (2). Any possible attachment means can be used to that end, however, adhesive means applied to the linear flaps will in general be preferred. The inner volume configured by the channel-formed ribs (12)

can be advantageously used as a housing for at least part of the anchoring means (10) connecting the facet (2) and the longitudinal bars (7).

Figure 4A:
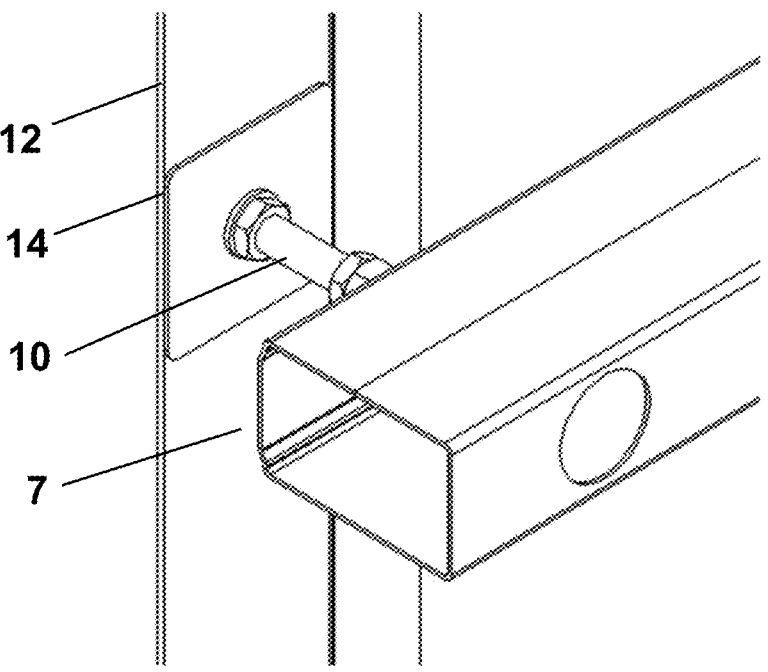
FIGS. 4a-4b show different views of the connections of a heliostat and a facet according to the present invention.
Figure 4B:
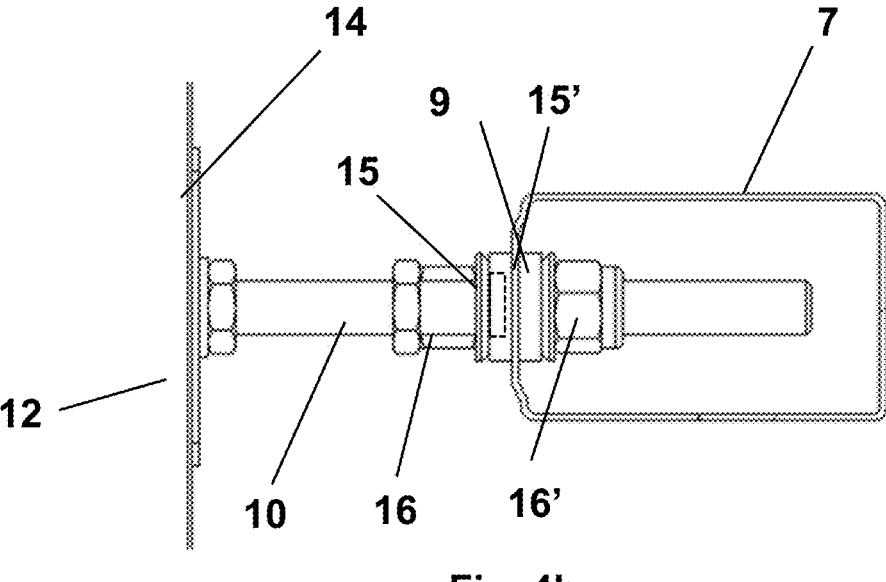

In a preferred embodiment of the invention, each rib (12) is configured with at least one anchoring orifice (13) adapted for its alignment with the anchoring points (9) of the bars (7). Thereby, the anchoring means (10) applied from an anchoring point (9) can pass through the anchoring orifice (13) and be fastened to the facet (2), fixing it to the heliostat (1) structure. In further embodiments of the invention, each rib (12) can comprise two or more anchoring orifices (13), and each anchoring orifice (13) can comprise a fixation flange (14), for providing enhanced robustness to the connection between the bars (7) and the facets (2). Optionally, in a further embodiment of the invention, at least part of the anchoring means (10) can be advantageously housed within the longitudinal bars (7), as shown in FIGS. 4a-4b. Also, the anchoring means (10) can comprise one or more washers (15, 15') or any other joining means for improving the effectiveness of the connections of the facets (2) to the longitudinal bars (7). In a preferred embodiment of the invention, the washers (15, 15') are configured as conical-spherical pairs of connectors. Thanks to this configuration, misalignments between the relative orientations of the longitudinal bars and the facet can be achieved, without affecting the relative orientation of the anchoring means and the facet.

Thanks to the arrangement of at least three parallel ribs (12) in the facet (2), as well as to the application of linearly adjustable anchoring means (10) to the anchoring orifices (13) of said ribs (12), the curvature of the facet (2) around an axis parallel to the ribs (12) can be adjusted by varying the relative distances between the corresponding at least three anchoring orifices (13) of the ribs (12) and the anchoring points (9) of the bars (7). The variation of this distances can be obtained, for instance, by adjusting the position of nut fasteners (16, 16') comprised in the anchoring means (10), as the ones depicted in FIGS. 4a and 4b of the present document. In different embodiments of the invention, one, two or three of the anchoring means (10) of the at least three ribs (12) are adjustable.

This feature is remarkably advantageous compared to other known facets, as it allows adapting the curvature of each facet (2) in the heliostat (1) after its installation in the solar field. As a result, the need of complex curving processes applied to the facet (2) during its manufacturing can be, at least in part, avoided with the present invention. For example, in a preferred embodiment of the invention the facets (2) can undergo a curving process only around an axis perpendicular to the ribs (12) during its fabrication. This operation is much simpler, faster, and cheaper than curving the facets (2) over two axes at the factory. Later on, once the facets (2) have been installed at the longitudinal arms (7) of the heliostat (1), they can be further curved manually around the axis parallel to the ribs (12), by configuring the distances between the anchoring orifices (13) and the anchoring points (9) with the adjustment of the anchoring means (10). Moreover, this adjustment can be performed at any moment during the lifespan of the heliostat (1), without dismounting the facets (2).

The use of parallel ribs (12) according to the invention not only simplifies the curving processes of the facets (2), but also improves their robustness and can help reducing optical losses due to thermal expansion in operation conditions. Moreover, the fabrication of the ribs (12) according to the invention can be easily obtained through line manufacturing, cutting the ribs (12) from a longer linear piece in the factory.

This process is fast, cost-reduced and does not require complex design profiles of facet-supporting elements for obtaining cylindrical, spherical, parabolic or any other desired geometries in the facet's surface. The mirror used can be also flat, and does not need to have any prior curvature, since the curvature of the facet (2) on the axis perpendicular to the ribs (12) is achieved during the process of attaching the main body (11) of the facet (2) to the ribs (12) in one axis and, in the other axis, during the process of assembly and canting of the facet (2) to the heliostat (1).

The invention claimed is:

1. A solar concentrator comprising:
a concentrator main body;
a pedestal;
a plurality of transverse arms supported by the concentrator main body, wherein the plurality of transverse arms are connected to a plurality of longitudinal bars; and
one or more facets configured to be used as reflective elements of the solar concentrator, the one or more facets comprising a facet main body defining a front surface and a back surface, wherein the back surface of the facet main body is attached to at least three substantially linear ribs arranged substantially parallel along said back surface;
wherein at least one of the at least three ribs is configured with adjustable anchoring fasteners adapted for connection to the plurality of longitudinal bars such that a distance between the at least one of the at least three ribs and the plurality of longitudinal bars can be varied by adjusting the anchoring fasteners;
wherein the plurality of longitudinal bars are configured with a plurality of anchoring points adapted to attach the one or more facets to the plurality of longitudinal bars through the anchoring fasteners; and
wherein each of the at least three ribs comprises a plurality of anchoring orifices adapted for receiving the anchoring fasteners.

2. The solar concentrator according to claim 1, wherein at least part of the anchoring fasteners are housed within the plurality of longitudinal bars.

3. The solar concentrator according to claim 1, wherein the at least three ribs are channel-formed and comprise fixation surfaces adapted for attachment to the back surface of the facet main body.

4. The solar concentrator according to claim 3, wherein the fixation surfaces comprise linear flaps arranged at both sides of the at least three ribs, and wherein the at least three ribs are attached to the back surface of the facet main body through adhesive means applied to the linear flaps.

5. The solar concentrator according to claim 3, wherein an inner volume defined by the at least three ribs is configured as a housing for at least part of the anchoring fasteners.

6. The solar concentrator according to claim 1, wherein the anchoring fasteners comprise one or more washers configured as conical-spherical pairs of connectors.

7. The solar concentrator according to claim 1, wherein the facet main body comprises at least one of: a glass body, a metallic reflective body, a mirror body, a multi-layer or sandwich body, a plastic body, a foam body, a honeycomb body, or any combination thereof, in any possible order.

8. The solar concentrator according to claim 1, wherein the facet main body is one of: substantially flat, non-flat, parabolic, cylindrical, hyperbolic, or spherical.

9. The solar concentrator according to claim 1, wherein the concentrator main body comprises a torque tube, and wherein the plurality of longitudinal bars are arranged substantially parallel to said torque tube.

10. The solar concentrator according to claim 9, wherein:
the plurality of longitudinal bars are arranged substantially parallel to the torque tube;
the plurality of transverse arms are arranged substantially perpendicular to the torque tube;
the plurality of transverse arms are arranged on both sides of the torque tube;
one, two or three of the anchoring fasteners of the at least three ribs are adjustable; and/or
the connection between the plurality of transverse arms and the plurality of longitudinal bars comprises a plurality of fixing means comprising one or more of: screws, nuts, bolts, rivets, or flanges.

11. The solar concentrator according to claim 9, wherein the pedestal and the torque tube are configured with dual-axis tracking capacity.

12. A method for installing a facet for a solar concentrator, suitable for use as a reflective element of the solar concentrator, wherein the solar concentrator comprises a plurality of transverse arms supported by a concentrator main body, the plurality of transverse arms connected to a plurality of longitudinal bars, the plurality of longitudinal bars configured with a plurality of anchoring points adapted to attach the facet to the plurality of longitudinal bars through adjustable anchoring fasteners;
wherein the facet comprises a facet main body defining a front surface and a back surface;
wherein the back surface of the facet main body is attached to at least three substantially linear ribs arranged substantially parallel along said back surface;
wherein at least one of the at least three ribs is configured with the adjustable anchoring fasteners adapted for connection to the structure plurality of longitudinal bars of the solar concentrator, such that a distance between the at least one of the at least three ribs and the plurality of longitudinal bars can be varied by adjusting the anchoring fasteners; and
wherein each of the at least three ribs comprises a plurality of anchoring orifices adapted for receiving the adjustable anchoring fasteners in the solar concentrator;
wherein said method comprises performing the following steps of:
a) mounting the facet in the solar concentrator, by connecting the facet to one or more of the plurality of longitudinal bars through the anchoring fasteners; and
b) adjusting the curvature of the facet around an axis substantially parallel to the at least three ribs, by varying relative distances between at least one of the at least three ribs and the plurality of longitudinal bars.

13. The method according to claim 12, wherein a canting operation comprising orienting the facet relative to the solar concentrator is performed during step b) of the method.

14. The method according to claim 12, further comprising the following step before step a):
c) adjusting the curvature of the facet around at least one axis thereof, wherein said axis is substantially perpendicular to the axis adjusted in step b).

15. The method according to claim 14, wherein, in step c), a curvature on the facet main body is generated by attaching the back surface of the facet main body to the at least three ribs.

\* \* \* \* \*